(12) United States Patent
Loefstrand et al.

(10) Patent No.: US 11,509,622 B2
(45) Date of Patent: Nov. 22, 2022

(54) FACILITATING COMMUNICATION BETWEEN RESOURCES IN DIFFERENT NETWORK ENVIRONMENTS

(71) Applicant: SAP SE, Walldorf (DE)

(72) Inventors: Jan Mikael Loefstrand, Hillsborough, CA (US); Rajesh Narayanan, San Jose, CA (US); Mohamed Ghassen Gargouri, Menlo Park, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/122,842

(22) Filed: Dec. 15, 2020

(65) Prior Publication Data
US 2022/0191163 A1 Jun. 16, 2022

(51) Int. Cl.
*H04L 61/106* (2022.01)
*H04L 12/46* (2006.01)
*H04L 61/4511* (2022.01)

(52) U.S. Cl.
CPC ........ *H04L 61/106* (2013.01); *H04L 12/4633* (2013.01); *H04L 12/4641* (2013.01); *H04L 61/4511* (2022.05)

(58) Field of Classification Search
None
See application file for complete search history.

(56) References Cited

U.S. PATENT DOCUMENTS

| 2009/0300750 A1* | 12/2009 | Chou | H04L 67/02 726/12 |
| 2019/0007366 A1* | 1/2019 | Voegele | H04L 61/4511 |
| 2021/0036887 A1* | 2/2021 | Meng | H04L 12/66 |

FOREIGN PATENT DOCUMENTS

| KR | 20020040102 A | * | 5/2002 |
| KR | 101776882 B1 | * | 9/2017 |

* cited by examiner

*Primary Examiner* — Younes Naji
(74) *Attorney, Agent, or Firm* — Fountainhead Law Group P.C.

(57) ABSTRACT

Some embodiments provide a method for connecting a client of a first network to a service of a second network. The method includes registering the service of the second network. The method then receives, from a client of the first network, a request to communicate with the service, the client not having an address of the service. The method further assigns an IP address to the service and sends the IP address to the client. Additionally, the method sends, to an inter-network hub that connects the first network and the second network, a message in order for the inter-network hub to establish a first tunnel between the inter-network hub and a first gateway associated with the client and a second tunnel between the inter-network hub and a second gateway associated with the service.

20 Claims, 9 Drawing Sheets

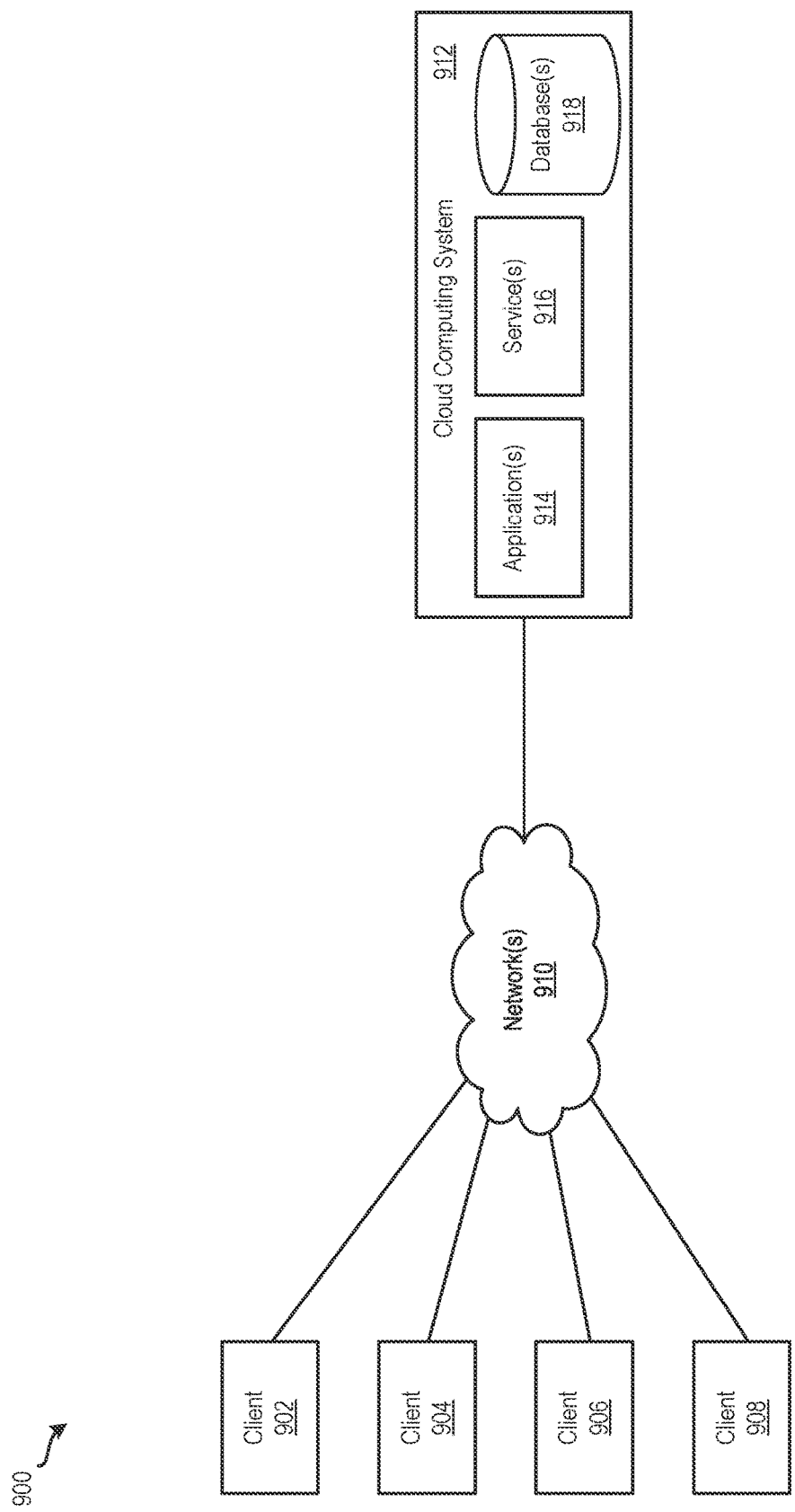

FACILITATING COMMUNICATION BETWEEN RESOURCES IN DIFFERENT NETWORK ENVIRONMENTS

BACKGROUND

Organizations often deploy computational workloads across different infrastructures such as on-premises landscapes and virtual public clouds (VPCs). For example, for a process having components A, B, and C, the organization may desire to have component A performed by an on-premises landscape, component B performed by VPC 1, and component C performed by VPC 2. This distribution of workloads may result in greater efficiencies in performing the process. However, configuring on-premises landscapes and various VPCs so that they communicate securely with one another for distributed processes may be challenging.

SUMMARY

In some embodiments, a method for connecting a client of a first network to a service of a second network is provided. The method includes registering the service of the second network at a computing device. The method also includes receiving, from the client of the first network, a request to communicate with the service, the client not having an address of the service to communicate with the service. The method includes assigning, by the computing device, an internet protocol (IP) address to the service and sending the IP address to the client. The method moreover includes sending, from the computing device to an inter-network hub that connects the first network and the second network, a message including the IP address of the service in order for the inter-network hub to establish a first tunnel between the inter-network hub and a first gateway associated with the client and a second tunnel between the inter-network hub and a second gateway associated with the service.

In some embodiments, the message is a first message. In these embodiments, the method includes the inter-network hub sending the first gateway a second message that configures the first gateway to route traffic received from the client and addressed to the IP address of the service to the inter-network hub for communication to the service.

In some embodiments, the message is a first message. In these embodiments, the step of registering the service of the second network includes receiving, at the computing device from the service, a second message including a service name, a destination IP address, and an identifier for the second gateway. The step also includes sending an update to a domain name system (DNS) with the service name and the destination IP address.

In some embodiments, the request to communicate with the service includes the service name In this embodiment, the step of assigning the IP address includes determining that the service name in the request to communicate with the service is registered at the DNS. The step further includes selecting, by the computing device, the IP address from a pool of IP addresses local to the first network. The step also includes sending an update to DNS with the IP address to replace the destination IP address for the service name. In this embodiment, the DNS sends the IP address to the client in response to the request to communicate with the service.

In some embodiments, the first network is a on-premises network and wherein the second network is a virtual private cloud (VPC).

In some embodiments, the first network includes the computing device.

In some embodiments, a non-transitory machine-readable medium storing a program executable by at least one processing unit of a device for connecting a client of a first network to a service of a second network is provided. The program includes instructions for registering, at a computing device, the service of the second network. The program also includes instructions for receiving, from the client of the first network, a request to communicate with the service, the client not having an address of the service to communicate with the service. The program further includes instructions for assigning, by the computing device, an internet protocol (IP) address to the service and sending the IP address to the client. The program moreover includes instructions for sending, from the computing device to an inter-network hub that connects the first network and the second network, a message including the IP address of the service in order for the inter-network hub to establish a first tunnel between the inter-network hub and a first gateway associated with the client and a second tunnel between the inter-network hub and a second gateway associated with the service.

In some embodiments, the message is a first message. In these embodiments, the inter-network hub sends the first gateway a second message that configures the first gateway to route traffic received from the client and addressed to the IP address of the service to the inter-network hub for communication to the service.

In some embodiments, the message is a first message. In these embodiments, the instructions for registering the service of the second network includes instructions for receiving, at the computing device from the service, a second message including a service name, a destination IP address, and an identifier for the second gateway. The instructions also include instructions for sending an update to a domain name system (DNS) with the service name and the destination IP address.

In some embodiments, the request to communicate with the service includes the service name. In these embodiments, the instructions for assigning the IP address comprises instructions for determining that the service name in the request to communicate with the service is registered at the DNS. The instructions also include instructions for selecting, by the computing device, the IP address from a pool of IP addresses local to the first network. The instructions further include instructions for sending an update to DNS with the IP address to replace the destination IP address for the service name. In these embodiments, the DNS sends the IP address to the client in response to the request to communicate with the service.

In some embodiments, the first network is a on-premises network and wherein the second network is a virtual private cloud (VPC).

In some embodiments, the first network includes the computing device.

In some embodiments, the first network includes the first gateway and wherein the second network includes the second gateway.

In some embodiments, a system is provided that includes a set of processing units. The system also includes a non-transitory machine-readable medium storing a program for connecting a client of a first network to a service of a second network and executable by the set of processing units. The program includes instructions for registering the service of the second network. The program also includes instructions for receiving, from the client of the first network, a request to communicate with the service, the client not having an address of the service to communicate with the service. The program includes instructions for assigning an internet protocol (IP) address to the service and sending the IP address to the client. The program moreover includes instructions for sending, to an inter-network hub that connects the first network and the second network, a message including the IP address of the service in order for the inter-network hub to establish a first tunnel between the inter-network hub and a first gateway associated with the client and a second tunnel between the inter-network hub and a second gateway associated with the service.

In some embodiments, the message is a first message. In these embodiments, the inter-network hub sends the first gateway a second message that configures the first gateway to route traffic received from the client and addressed to the IP address of the service to the inter-network hub for communication to the service.

In some embodiments, the message is a first message. In these embodiments, instructions for registering the service of the second network comprises instructions receiving, from the service, a second message including a service name, a destination IP address, and an identifier for the second gateway. The instructions also include instructions for sending an update to a domain name system (DNS) with the service name and the destination IP address.

In some embodiments, the request to communicate with the service includes the service name. In these embodiments, the instructions for assigning the IP address comprises instructions for determining that the service name in the request to communicate with the service is registered at the DNS. The instructions also include instructions for selecting the IP address from a pool of IP addresses local to the first network. The instructions further include instructions for sending an update to the DNS with the IP address to replace the destination IP address for the service name In these embodiments, the DNS sends the IP address to the client in response to the request to communicate with the service.

In some embodiments, the first network is a on-premises network and wherein the second network is a virtual private cloud (VPC).

In some embodiments, the first network includes the system and the first gateway and the second network includes the second gateway.

The following detailed description and accompanying drawings provide a better understanding of the nature and advantages of various embodiments of the present disclosure.

BRIEF DESCRIPTION OF THE DRAWINGS

FIG. 9 illustrates an exemplary system for implementing various embodiments described above.

DETAILED DESCRIPTION

Figure 1:
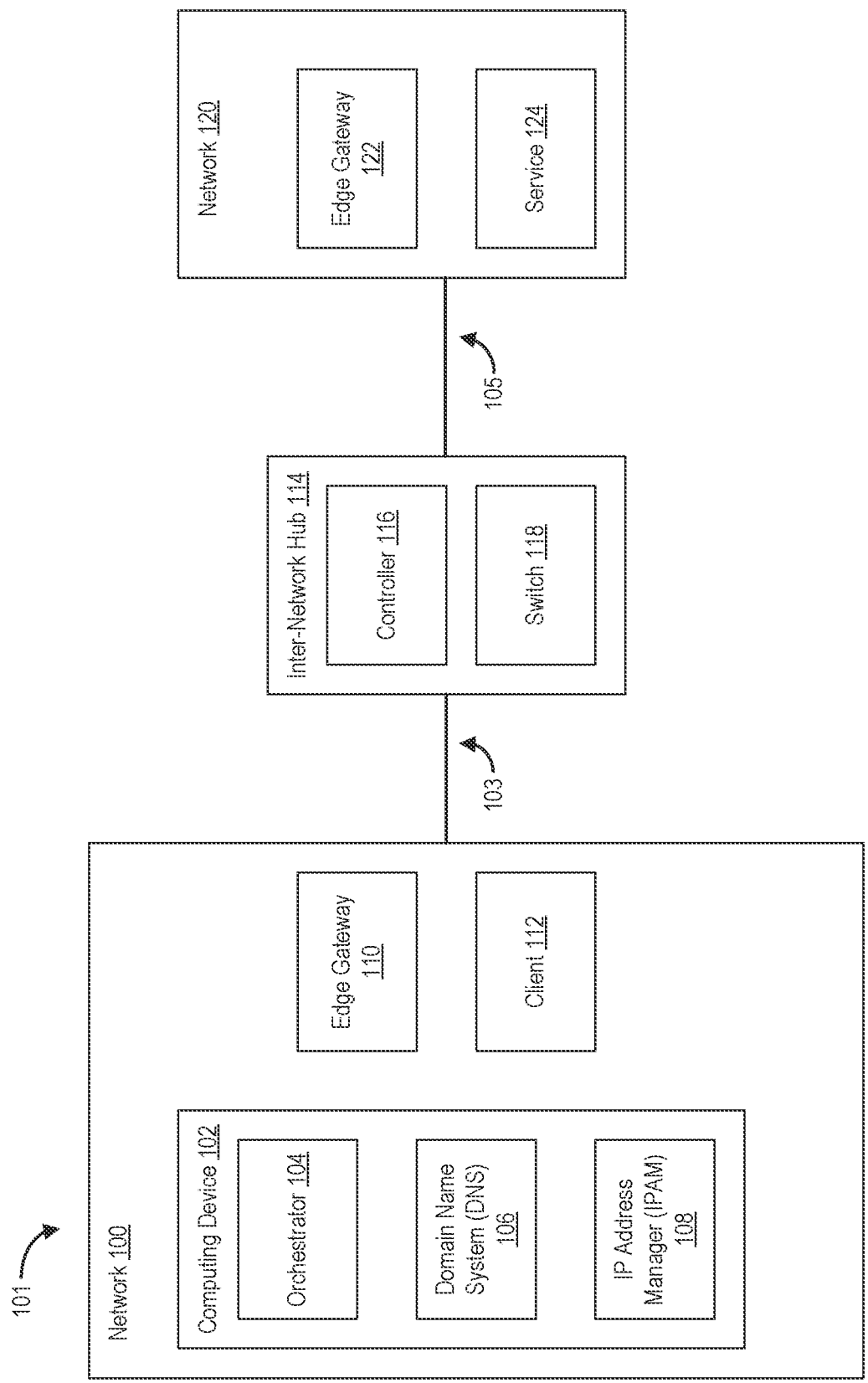
FIG. 1 illustrates a system for service registration, service discovery, and service stitching for facilitating communication between resources in different network environments according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for a establishing a connection between a client of a first network and a service of a second network. The connection may be referred to as an overlay network. The connection may be based upon tunnels created between the first network and an inter-network hub and between the inter-network hub and the second network. Together, the tunnel between the first network and the inter-network hub and the tunnel between the inter-network hub and the second network form a logical link between the first network and the second network. In some embodiments, the first network may be an on-premises network while the second network may be a virtual private cloud (VPC) such as Amazon Web Services (AWS), Google Cloud Platform (GCP), Microsoft Azure, Alibaba Cloud. In some embodiments, the service registers itself (also referred to as self-registration) at a cloud connectivity services orchestrator (CCSO). This may be referred to as service registration. Next, the CCSO may receive from the client a request to communicate with the service. At this point, the client may know of the service through its service name but may not otherwise know how to communicate with the service. In response to the request from the client, the CCSO may assign an internet protocol (IP) address to the service and send the IP address to the client. This may be referred to as service discovery. Next, the CCSO may send a message to the inter-network hub situated between the first and second networks to establish the connection between the client and the service. In particular, the inter-network hub may configure an edge gateway within the first network with a tunnel endpoint to establish a tunnel between the inter-network hub and the edge gateway of the first network. Once this tunnel is established, the edge gateway may route traffic received from the client and destined for the service to the inter-network hub via the tunnel. Similarly, the inter-network hub may configure an edge gateway within the second network with a tunnel endpoint to establish a tunnel between the inter-network hub and the edge gateway of the second network. Once this tunnel is established, the edge gateway may route traffic to the service that is received through the tunnel from the inter-network hub (e.g., from the client) and destined for the service. This may be known as service stitching. In some embodiments, the two tunnels are being used to implement a single logical connection between the client and the service.

The techniques described in the present application provide a number of benefits and advantages over conventional methods of establishing connections between endpoints of distinct networks. For example, the techniques allow for the reduction in time it takes to establish connections between endpoints in distinct networks by bypassing certain network security protocols used in conventional methods while maintaining the same level of security. Conventional methods of connecting endpoints in different networks may require various security approvals and configuration of ports. The techniques described here provide connections between different networks without such steps, resulting in faster connection establishment.

FIG. 1 illustrates a system 101 for service registration, service discovery, and service stitching for facilitating communication between resources in different network environments, according to some embodiments. More particularly, system 101 establishes a logical connection between client 112 of network 100 and service 124 of network 120 to enable end-to-end application traffic between client 112 and service 124. The logical connection established between client 112 and service 124 may be referred to as an overlay network. In some embodiments, an overlay network is a logical network implemented by an underlying physical network infrastructure (e.g., physical links, physical networking devices, etc.). As shown, system 101 includes network 100, inter-network hub 114, and network 120. Network 100 is shown to be connected to inter-network hub 114 via underlay link 103. Network 120 is shown to be connected to inter-network hub 114 via underlay link 105. An underlay link may be the physical infrastructure that is responsible for delivering packets across networks (e.g., network 100, network 120, the Internet, etc.). The underlay link may include physical lines, routers, and/or switches. Underlay links 103 and 105 may be part of the Internet or may be private links. In this example, the logical connection mentioned above between client 112 and service 124 is implemented by underlay links 103 and 105.

Network 100 can be configured to provide a networked environment in which a group of computing devices communicate over digital connections. In one example, network 100 may be an on-premises network where computational resources within the network can only be accessible locally by approved users of the computational resources. For example, if an on-premises network includes application servers, file servers, and database servers connected to a local area network (LAN), these resources may be only accessible by approved users on the LAN. In other words, computational resources in an on-premises network cannot be accessed by users external to the network. As shown in FIG. 1, network 100 includes computing device 102, edge gateway 110, and client 112. Client 112 serves to perform a component of a distributed process. Client 112 may be any application executing on any computing device. Examples of client 112 include an enterprise resource planning (ERP) application, a data management application, a data analytics application, a human resources application, a web application, among others. Examples of computing devices executing client 112 include a desktop computer, an application server, a database server, a web server, a virtual machine, among others.

Computing device 102 may be responsible for managing and facilitating access to services (e.g., services in network 100, services in network 120 (e.g., service 124), etc.). As shown, computing device 102 includes orchestrator 104, domain name system (DNS) 106, and internet protocol (IP) address manager (IPAM) 108. Orchestrator 104 is configured to perform processes related to service registration, service discovery, and service stitching. In relation to service registration, orchestrator 104 may receive a registration request from service 124 notifying orchestrator 104 that service 124 is available. The request may include a destination IP address of service 124. In response, orchestrator 104 may send a message to DNS 106 to create or update an entry in DNS 106 with information regarding service 124. This information may include the destination IP address of service 124. Moreover, orchestrator 104 may receive a registration request from client 112. In response to this request, orchestrator 104 may send a message to DNS 106 to create or update an entry in DNS 106 with information related to client 112.

In relation to service discovery, orchestrator 104 may receive a service request notification from DNS 106 indicating that client 112 is requesting to access service 124. In response, orchestrator 104 may assign an IP address to service 124 that is different from the destination IP address. For example, the original destination IP address may not be usable by client 112 to contact service 124 because service 124 is in a different network than client 112. As a result, orchestrator 104 may assign a new IP address that client 112 may use to communicate with service 124 once a tunnel is established between network 100 and network 120. To accomplish this, orchestrator 104 may assign a new IP address from a pool of IP addresses local to network 100 to be associated with service 124. To do so, orchestrator 104 may send a message to IPAM 108 requesting IPAM 108 to a select the IP address from a local pool of IP addresses. In response, orchestrator 104 may receive the IP address to be associated with service 124 from IPAM 108. Next, orchestrator 104 may send a message to DNS 106 to update the entry associated with service 124 with the assigned IP address.

In relation to service stitching, orchestrator 104 may also send a message to inter-network hub 114 in response to receiving the service request notification from DNS 106. The message may configure inter-network hub 114 to establish tunnels between edge gateway 110 and inter-network hub 114 and between inter-network hub 114 and edge gateway 122. The message may also include instructions for inter-network hub 114 to route traffic from client 112 to service 124 via edge gateway 122. In some embodiments, orchestrator 104 may send this message to inter-network hub 114 through an application programming interface (API) provided by inter-network hub 114. The established tunnels form a logical connection that may then support end-to-end application traffic between client 112 and service 124.

DNS 106 is responsible for storing domain names and corresponding IP addresses as well as responding to requests for them. For example, during service registration, DNS 106 may receive a message from orchestrator 104 to create an entry with a service name for service 124 (e.g., an internet domain name) and a corresponding destination IP address for service 124. In response, DNS 106 creates an entry in a database including the service name and the destination IP address. Additionally, during service discovery, DNS 106 may receive a DNS request from client 112 requesting the IP address of service 124. In response, DNS 106 does not send to client 112 the destination IP address of service 124, which cannot be used to access service 124. Instead, DNS 106 notifies orchestrator 104 that client 112 is requesting to communicate with service 124. DNS 106 then receives from orchestrator 104 the assigned IP address. Unlike the original destination IP address, the assigned IP address enables client 112 to communicate with service 124 once a logical connection is established. Once DNS 106 receives from orchestrator 104 the assigned IP address, DNS 106 may update the entry for service 124 with the assigned IP address. Next, DNS 106 may respond to the DNS request by sending client 112 the assigned IP address.

In some embodiments, DNS 106 communicates with orchestrator 104 each time it receives a DNS request from clients of network 100. In response to a DNS request, orchestrator 104 may either instruct DNS 106 to respond to the DNS request with an IP address already stored at DNS 106 or send it a newly assigned IP address with which DNS 106 will respond to the DNS request. For example, if orchestrator 104 has already assigned an IP address to service 124, then orchestrator 104 may instruct DNS 106 to respond to a DNS request with the IP address already stored for service 124 at DNS 106. If instead orchestrator 104 has not yet assigned the IP address to service 124, orchestrator 104 may then send DNS 106 a newly assigned IP address for it respond to the DNS request. In some embodiments, orchestrator 104 may be configured with a database for keeping track of whether or not it has assigned an IP address to service 124. In some such embodiments, orchestrator 104 may record in the database each time it assigns an IP address to a service. When orchestrator 104 receives a communication from DNS 106 relating to a DNS request for a given service, orchestrator 104 may check whether the database has a record of it assigning an IP address to that service. If orchestrator 104 determines there is such a record in the database, orchestrator 104 may instruct DNS 106 to respond to the DNS request with the IP address already stored for that service at DNS 106. If orchestrator 104 determines there is no such record in the database, orchestrator 104 may have an IP address assigned to that service, the assigned IP address being sent to DNS 106. Orchestrator 104 may also record in the databases that an IP address has been assigned to that service. As such, if orchestrator 104 receives a subsequent communication from DNS 106 regarding a DNS request for that service, orchestrator 104 may then instruct DNS 106 to use the assigned IP address that DNS 106 has.

IPAM 108 is responsible for selecting an IP address from a pool of available IP addresses in network 100 to be assigned to service 124. For example, IPAM 108 may scan network 100 to determine which IP addresses are available and which are not. IPAM 108 may receive a message from orchestrator 104 requesting that an IP address be selected. In response, IPAM 108 may select an IP address from the pool of available IP addresses and remove the selected IP address from the pool of available IP addresses. Once IPAM 108 has selected the IP address, IPAM 108 may communicate the IP address to orchestrator 104 so that orchestrator 104 may assign the IP address to service 124.

Edge gateway 110 can be configured to be a point of entry and exit for communications between devices within network 100 and devices outside of network 100. More particularly, edge gateway 110 may route traffic from client 112 to inter-network hub 114 for communication to service 124 and may also route traffic from inter-network hub 114 to client 112. Edge gateway 110 may receive a message from inter-network hub 114 that configures edge gateway 110 with a tunnel endpoint to establish a tunnel between inter-network hub 114 and edge gateway 110. Additionally, the message may also configure edge gateway 110 to route traffic received from client 112 and addressed to the IP address assigned to service 124 to the inter-network hub 114. In response, edge gateway 110 may update its configuration to route traffic that is received from client 112 and addressed to the IP address assigned to service 124 through the tunnel to inter-network hub 114. After edge gateway 110 updates its configuration, edge gateway 110 may receive application traffic from client 112. The application traffic may be addressed to the IP address assigned to service 124 by orchestrator 104. Next, edge gateway 110 may route the application traffic to inter-network hub 114 via the tunnel so that the application traffic may be delivered to network 120.

Inter-network hub 114 is responsible for providing connectivity between different networks, such as between network 100 and network 120. As shown, inter-network hub 114 includes a controller 116 and a switch 118. Controller 116 is responsible for configuring edge gateway 110, edge gateway 122, and switch 118. More particularly, controller 116 may configure edge gateway 110 and edge gateway 122 with tunnel endpoints for the establishment of respective tunnels. Controller 116 may receive a message from orchestrator 104 to establish a connection between edge gateway 110 and edge gateway 122. In response, controller 116 may send a configuration message to edge gateway 110 that configures it with a tunnel endpoint to establish a first tunnel between inter-network hub 114 and edge gateway 110. The configuration message may also configure edge gateway 110 to route traffic addressed to the IP address assigned to service 124 to be delivered to inter-network hub 114. Additionally, controller 116 may send a configuration message to edge gateway 122 to configure it with a tunnel endpoint to establish a second tunnel between the inter-network hub 114 and edge gateway 122. The configuration message may also configure edge gateway 122 to route traffic from inter-network hub 114 to be delivered to service 124. Further, controller 116 may configure switch 118 to forward traffic from edge gateway 110 to edge gateway 122 in response to the message received from orchestrator 104. In some embodiments, the message includes instructions to execute shell scripts for editing routing tables managed by controller 116 and used by switch 118 for routing. In this example, controller 118 may execute the shell scripts included in the message to edit the routing tables. Once edited, switch 118 may be configured to route packets received from client 112 and addressed to the assigned IP address of service 125 to be forwarded to service 124. In some embodiments, orchestrator 104 sends configuration message via an application programming interface (API) provided by inter-network hub 114. Once controller 116 configures edge gateway 110, edge gateway 122, and switch 118, a logical connection between client 112 and service 124 is thereby formed that client 112 and service 124 may use to send application traffic to each other.

Switch 118 may be responsible for implementing a switching fabric that forwards traffic originating from client 112 to be delivered to service 124. Switch 118 may receive traffic originating from client 112. The traffic may be addressed to the assigned IP address. Switch 118 may forward this traffic to edge gateway 122 to be delivered to service 124. In addition, switch 118 may receive traffic originating from service 124. Switch 118 may forward this traffic to edge gateway 110 to be delivered to client 112.

Network 120 can be configured to provide a networked environment in which a group of computing devices communicate over digital connections. In one example, network 120 may be a cloud network that includes one or more virtual private clouds (VPCs). A VPC is a pool of computing resources within a cloud network that is allocated for a set of users. This pool of computing resources is isolated from other users of the cloud network. Unlike an on-premises network, computing resources within a cloud network may be accessible by users remotely (e.g., via the Internet). For instance, in cases where network 120 is a cloud network, client 112 may access resources in network 120 (e.g., service 124). As shown, network 120 includes edge gateway 122 and service 124. Edge gateway 122 can be configured to be a point of entry and exit for communications between devices within network 120 and devices outside network 120. More particularly, edge gateway 122 may route traffic from inter-network hub 114 to service 124 and from service 124 to inter-network hub 114. Edge gateway 122 may receive a message from inter-network hub 114 that configures edge gateway 122 with a tunnel endpoint for establishing a tunnel between inter-network hub 114 and edge gateway 122. The message may also configure edge gateway 122 to route traffic from inter-network hub 114 to service 124. In response, edge gateway 122 may update its configuration to route traffic from inter-network hub 114 to be delivered to service 124. After edge gateway 122 updates its configuration, edge gateway 122 may receive application traffic from inter-network hub 114 that client 112 sent. Once received, edge gateway 122 may route this traffic to be delivered to service 124.

Service 124 can be configured to perform any service for client 112. For example, service 124 may perform a web service, a database service, a Java service, a security service, among others. As noted above, in the context of service registration, service 124 registers itself at network 100 by sending a registration request to orchestrator 104. After inter-network hub 114 establishes tunnels with edge gateway 110 and edge gateway 122, service 124 may receive application traffic from client 112 via the tunnels. Service 124 may then send application traffic to client 112 via the tunnels.

While computing device 102 is shown to be included in network 100, other arrangements are possible. For example, computing device 102 may reside outside of network 100 at inter-network hub 114 or as a standalone device. Moreover, while DNS 106 and IPAM 108 are shown to be included in computing device 102, other arrangements are possible. For example, DNS 106 and/or IPAM 108 may be implemented on a computing device separate from computing device 102.

Figure 2:
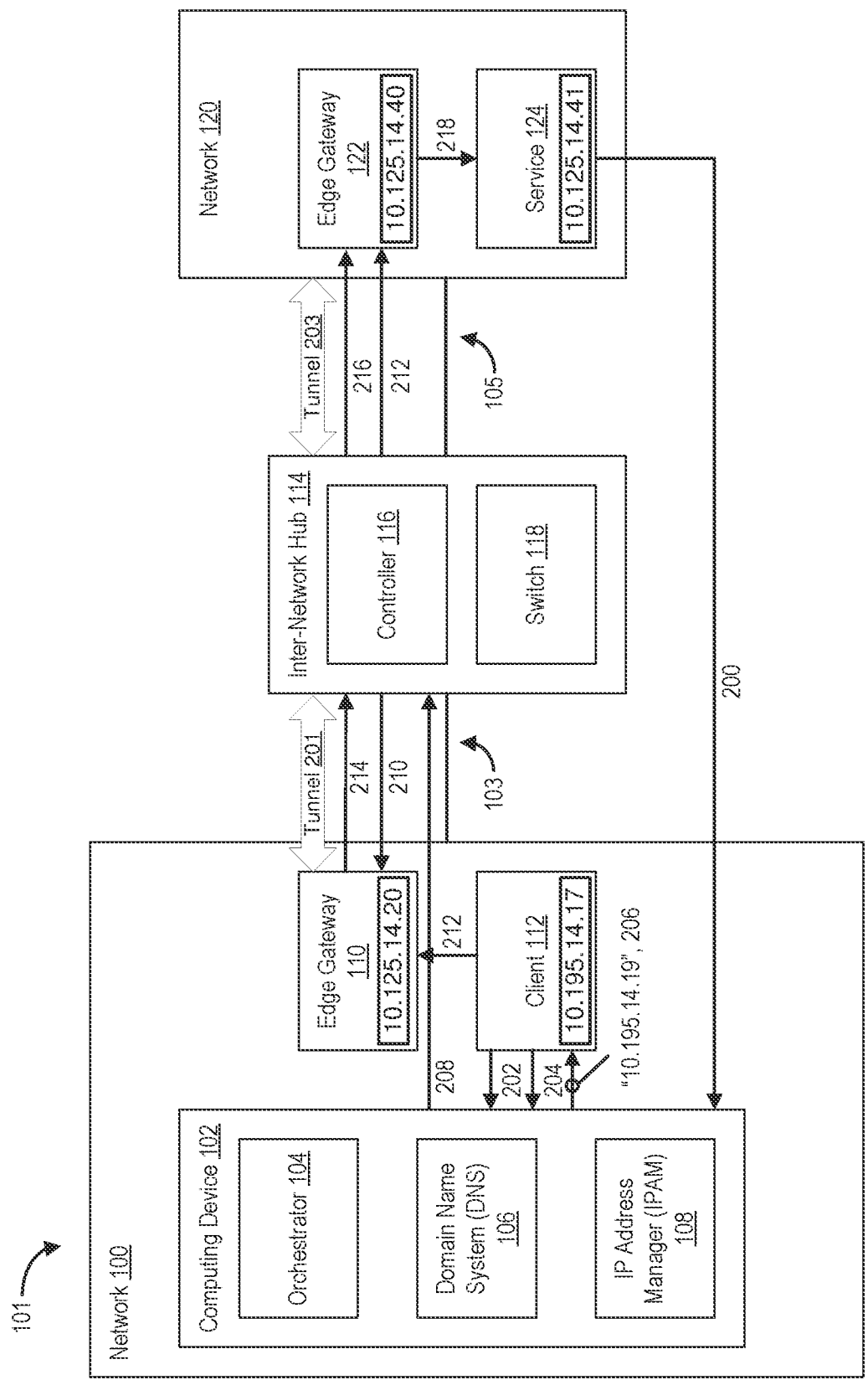
FIG. 2 shows a process for service registration, service discovery, and service stitching for facilitating communication between resources in different networks according to some embodiments.

FIG. 2 shows a process for service registration, service discovery, and service stitching for facilitating communication between resources in different networks, according to some embodiments. As discussed above, computing device 102 may be responsible for managing and facilitating access to services (e.g., services in network 100, services in network 120 (e.g., service 124), etc.). As shown, computing device 102 receives, at 200, a service registration request from service 124. Service 124 is shown to have an IP address of "10.125.14.41." Service 124 may be reachable via edge gateway 122, which has an IP address of "10.125.14.40." Service 124 may have sent this service registration request to advertise its availability to clients in network 100. In response, computing device 102 may register service 124 with the IP address "10.125.14.41." Additionally, service 124 may provide computing device 102 with the IP address "10.125.14.40" of edge gateway 122 during registration of itself with computing device 102. The IP address of edge gateway 122 notifies computing device 102 of which edge gateway to use to reach service 124. Computing device 102 is also shown to receive, at 202, a registration request from client 112, which is shown to have an IP address of "10.195.14.17." Client 112 may have sent the registration request to apprise computing device 102 of its existence and other identifying information. In this example, client 112 may provide computing device 102 with the IP address of edge gateway 110, which is shown to be "10.125.14.20." The IP address of edge gateway 110 notifies computing device 102 of which edge gateway to use to reach client 112. Next, computing device 102 receives, at 204, a request to communicate with service 124. For example, orchestrator 104 may receive the request to communicate with service 124 at 204. At the time of receiving the request at 204, client 112 might have the internet domain name of service 124 but may not have a routable address for service 124. In response to receiving the request at 204, computing device 102 does not send the IP address "10.125.14.41" that was used during registration of service 124 to client 112. Instead, computing device 102 may assign an IP address to service 124 with the use of IPAM 108. More particularly, for example, orchestrator 104 may send a message to IPAM 108 requesting IPAM 108 to select the IP address from a local pool of available IP addresses. In response, orchestrator 104 may receive the selected IP address from IPAM 108. In this example, orchestrator 104 may receive a selected IP address of "10.195.14.19." Next, orchestrator 104 may send a message to DNS 106 to update the entry associated with service 145 with the IP address "10.195.14.19." As shown, computing device 102 then sends, at 206, the IP address "10.195.14.19" to client 112 for client 112 to use in communicating with service 124. Moreover, computing device 102 sends, at 208, a message to inter-network hub 114 in order for the inter-network hub 114 to establish tunnels 201 and 203.

As noted above, inter-network hub 114 serves to provide connectivity between network 100 and network 120. Inter-network hub 114 is shown to receive, at 208, the message that enables the inter-network hub 114 to establish tunnels 201 and 203 and to configure switch 118. For example, the message may include the IP address "10.125.14.20" of edge gateway 110 and the IP address "10.125.14.40" of edge gateway 122. In response, inter-network hub 114 sends, at 210, a configuration message to edge gateway 110. The configuration message may configure edge gateway 110 with a tunnel endpoint for establishing tunnel 201 between inter-network hub 114 and edge gateway 110. Once edge gateway 110 is configured with this tunnel endpoint, tunnel 201 is formed between edge gateway 110 and inter-network hub 114. The configuration message may also configure edge gateway 110 to route traffic that is received by client 112 to inter-network hub 114 via tunnel 201. Further, inter-network hub 114 sends, at 212, a configuration message to edge gateway 122. The configuration message may configure edge gateway 122 with a tunnel endpoint for establishing tunnel 203 between inter-network hub 114 and edge gateway 122. Once edge gateway 122 is configured with this tunnel endpoint, tunnel 203 is thereby formed between inter-network hub 114 and edge gateway 122. Additionally, the configuration message may configure edge gateway 122 to route traffic from inter-network hub 114 to be delivered to service 124. Additionally, the message received at 208 may include instructions to edit routing tables managed by controller 116 and used by switch 118 for routing. In particular, the message may include instructions to edit routing tables such that switch 118 routes packets from "10.195.14.17" and addressed to "10.195.14.19" (i.e., the assigned IP address of service 124) to be routed to "10.125.14.41" by way of "10.125.14.40."

Once tunnels 201 and 203 are formed, client 112 sends, at 212, application traffic destined for service 124 to edge gateway 110. The application traffic may be addressed to the IP address "10.195.14.19." Next, at 214, edge gateway 110 routes this traffic to inter-network hub 114 using tunnel 201. Communication at 214 may be encrypted by edge gateway 110 using transport layer security (TLS) or secure socket layer (SSL). Then, inter-network hub 114 forwards, at 216, the application traffic to edge gateway 122 using tunnel 203. In some embodiments, inter-network hub 114 forwards the application traffic based on a pull mechanism. That is, inter-network hub 114 may deliver the application traffic when edge gateway 122 requests the traffic+. Finally, at 218, edge gateway 122 routes the traffic to service 124. Edge gateway 122 may be responsible for decrypting the application traffic prior to sending it to service 124.

Figure 3:
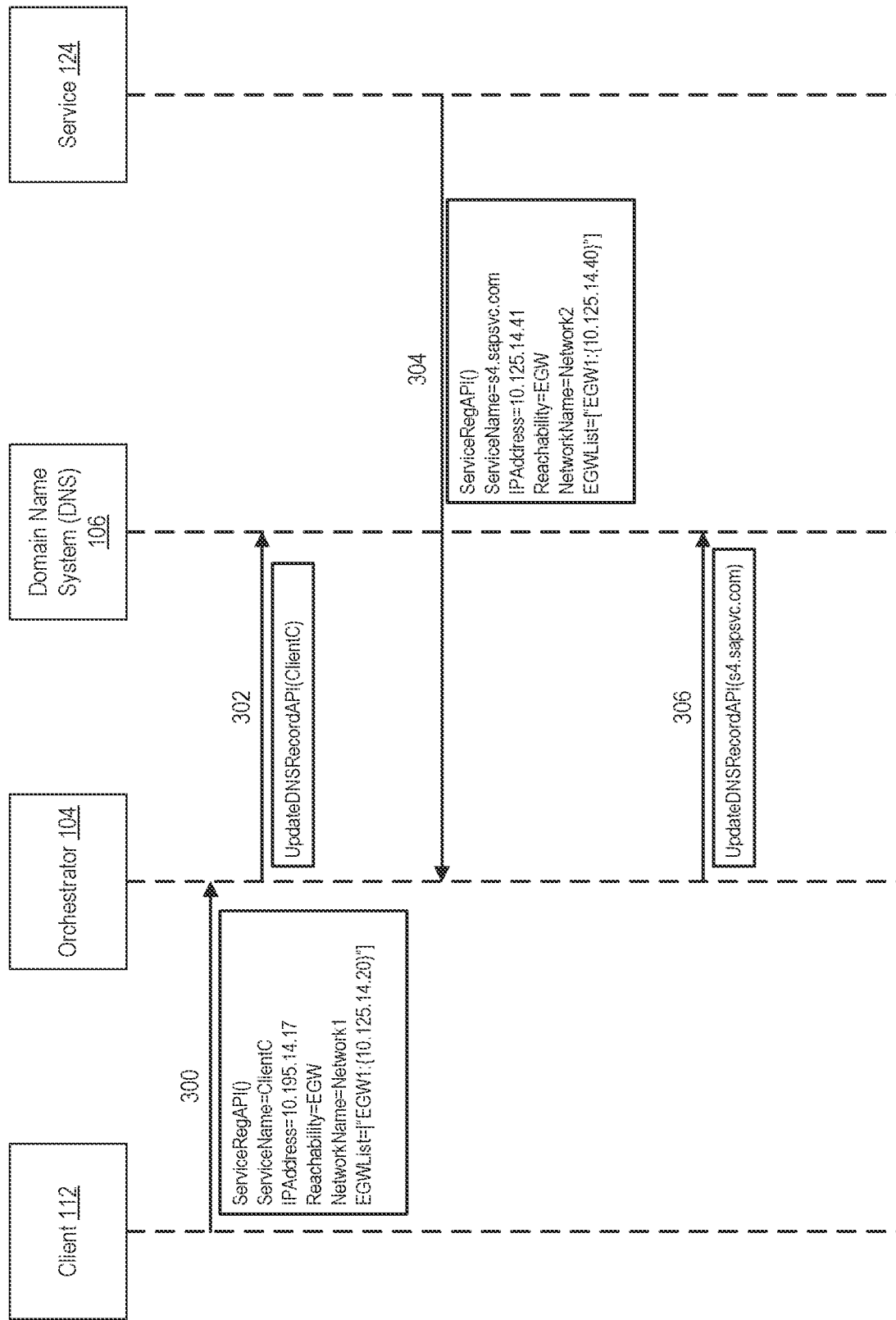
FIG. 3 illustrates a more detailed example of service registration according to some embodiments.

FIG. 3 illustrates a more detailed example of service registration, according to some embodiments. At 300, client 112 may send a registration request to orchestrator 104 to notify orchestrator 104 of its identity. In this example, the registration request is implemented by an API (e.g., "ServiceRegAPI( )") provided by orchestrator 104. The registration request may include the following:
ServiceName=ClientC
IPAddress=10.195.14.17
Reachability=EGW
NetworkName=Network1
EGWList=["EGW1:{10.125.14.20}"]
In this example, the registration request may include various identifying information for client 112. For example, the registration request specifies the following: (1) the service name of client 112 is "ClientC"; (2) the IP address of client 112 is "10.195.14.17"; (3) the reachability of client 112 is by edge gateway; (4) the network client 112 belongs to is called "Network1"; and (5) the list of edge gateways through which client 112 can be reached includes "EGW1," which has an IP address of "10.125.14.20." Once orchestrator 104 receives this message, orchestrator 104 sends, at 302, a message to DNS 106 to update or create the DNS record associated with client 112 with the service name "ClientC" and the IP address "10.195.14.17." Orchestrator 104 may update or create the DNS record using an API (e.g., "UpdateDNSRecordAPI( )") provided by DNS 106. At 304, service 124 is shown to send a registration request to orchestrator 104. In this example, the registration request may be implemented using an API (e.g., "ServiceRegAPI( )") provided by orchestrator 104. The registration request may include the following:
ServiceName=s4.sapsvc.com
IPAddress=10.125.14.41
Reachability=EGW
NetworkName=Network2
EGWList=["EGW1:{10.125.14.40}"]
In this example, the registration request specifies the following: (1) the service name of service 124 is "s4.sapsvc.com"; (2) the IP address of service 124 is "10.125.14.41"; (3) the reachability of service 124 is by edge gateway; (4) the network service 124 belongs to is called "Network2"; and (5) the list of edge gateways through which service 124 can be reached includes "EGW1," which has an IP address of "10.125.14.40." The IP address "10.125.14.41" may be referred to as the destination IP address. Once orchestrator 104 receives this message, orchestrator 104 sends, at 306, a message to DNS 106 to create or update a DNS record for service 124 with the service name "s4.sapsvc.com" and the IP address "10.125.14.40." Orchestrator 104 may create or update the DNS record using the "UpdateDNSRecordAPI( )" API provided by DNS 106.

Figure 4:
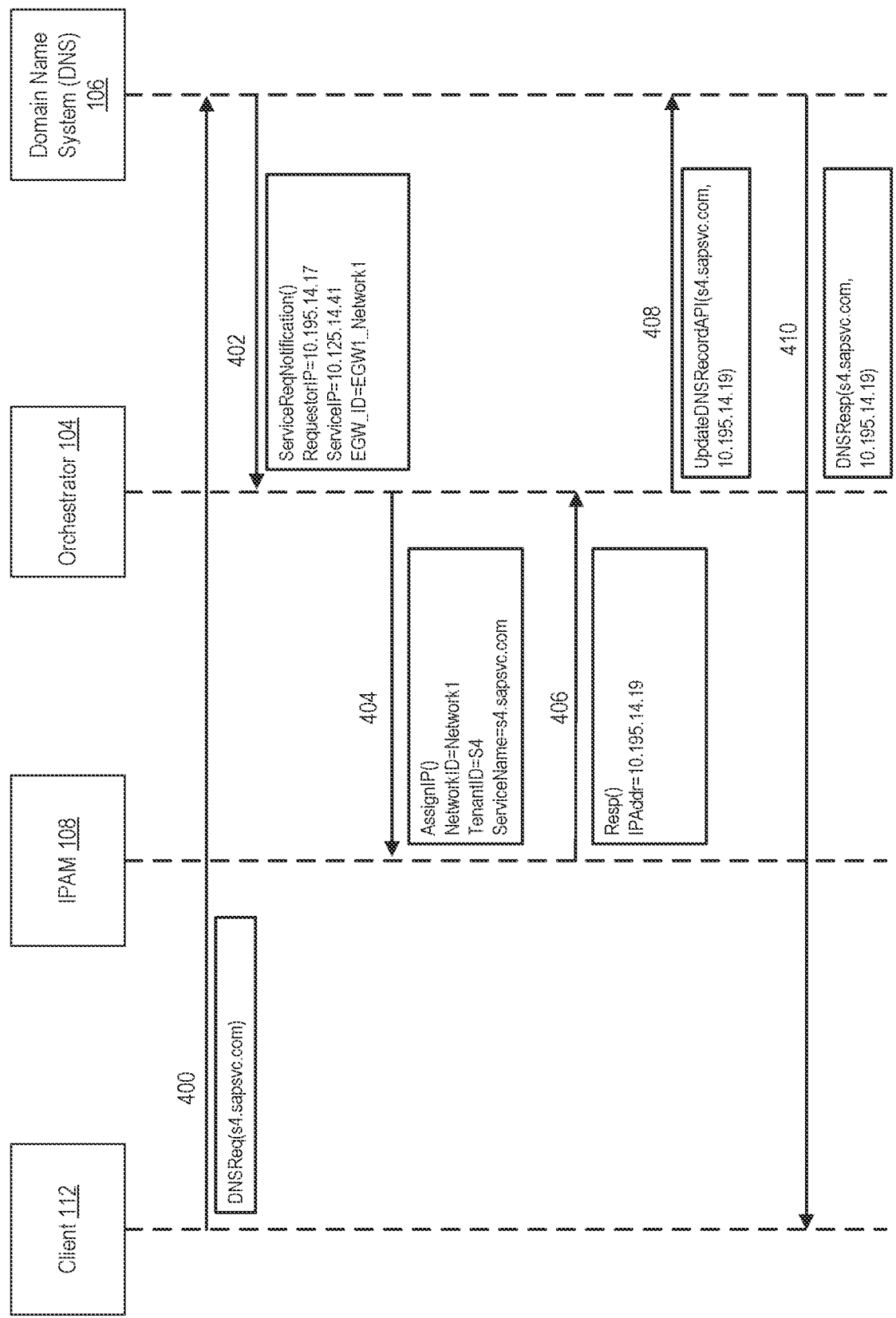
FIG. 4 illustrates a more detailed example of service discovery according to some embodiments.

FIG. 4 illustrates a more detailed example of service discovery, according to some embodiments. FIG. 4 shows processes occurring after orchestrator 104 has registered client 112 and service 124. At this stage, client 112 may request service 124 perform some process for it. At 400, client 112 sends a DNS request to DNS 106 for "s4.sapsvc.com" in order to access service 124. In response, DNS 106 does not respond with the IP address (e.g., "10.125.14.41") that service 124 registered itself with. Instead, DNS 106 sends, at 402, a message notifying orchestrator 104 that client 112 is requesting to communicate with service 124. The message may include the following:
RequestorIP=10.195.14.17
ServiceIP=10.125.14.41
EGW_ID=EGW1_Network1
In this example, the message at 402 specifies the following: (1) the requesting device has an IP address of "10.195.14.17"; (2) the IP address of service 124 is "10.125.14.41"; and (3) the edge gateway associated with client 112 has an identifier of "EGW1_Network1." Once orchestrator 104 receives this message, orchestrator 104 sends, at 404, a request to IPAM 108 to select an available IP address to be assigned to service 124. IPAM 108 then responds with the selected IP address of "10.195.14.19" at 406. Once orchestrator 104 receives the selected IP address, orchestrator 104 may assign that IP address to service 124 by sending, at 408, a message to DNS 106. The message is to update the entry associated with service 124. In particular, the IP address "10.195.14.19" replaces the destination IP address of "10.125.14.41" within DNS 106. Orchestrator may use an API (e.g., "UpdateDNSRecordAPI( )") provided by DNS 106 to accomplish this. Once completed, DNS 106 responds to the DNS request with the assigned IP address of "10.195.14.19" at 410. Client 112 may use "10.195.14.19" for future communication with service 124.

Figure 5:
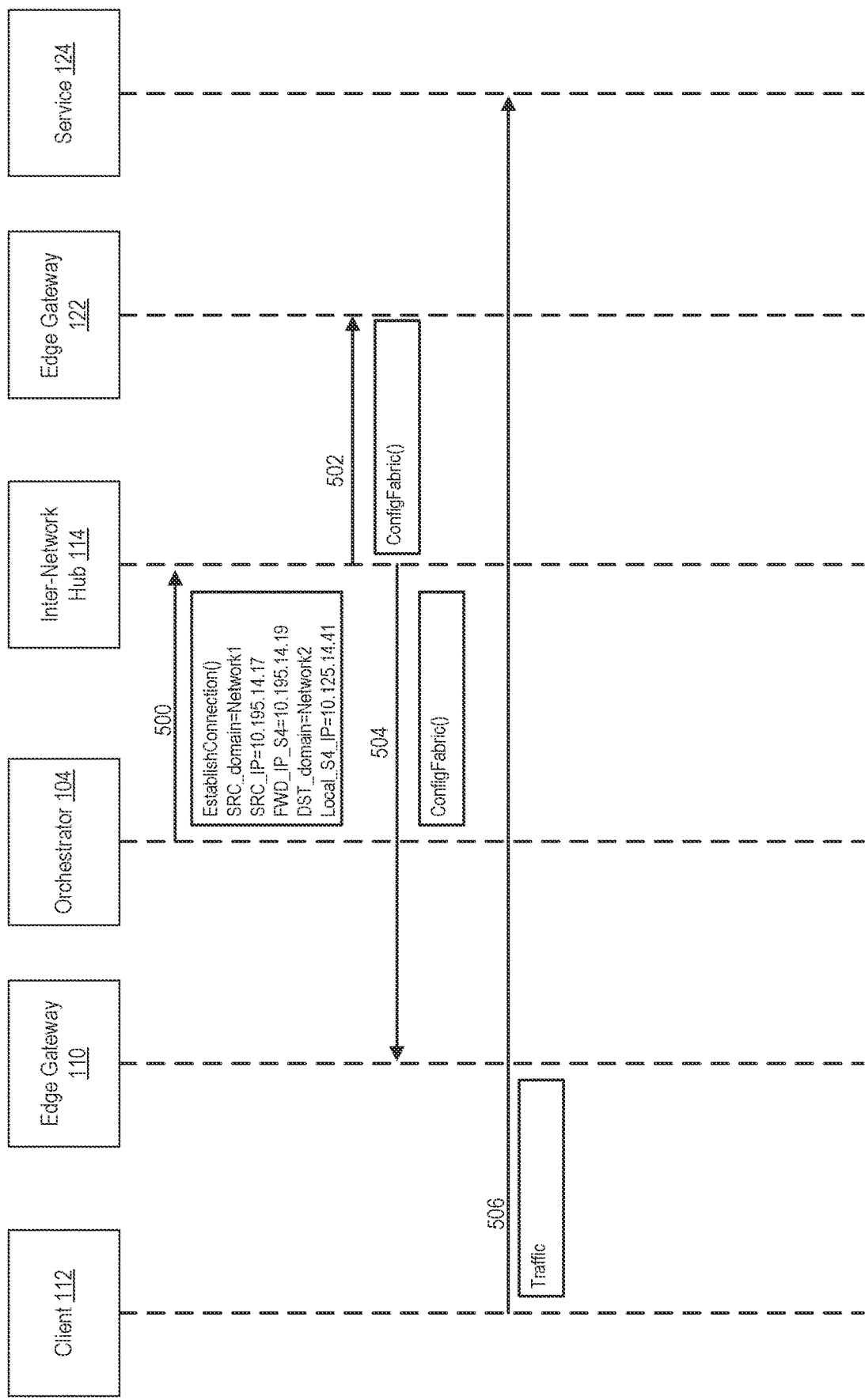
FIG. 5 illustrates a more detailed example of service stitching according to some embodiments.

FIG. 5 illustrates a more detailed example of service stitching, according to some embodiments. FIG. 5 shows processes occurring after service discovery processes shown in FIG. 4 are completed. For example, client 112 may have just received the IP address assigned to service 124. As shown, orchestrator 104 sends, at 500, a message to inter-network hub 114 in order to establish a tunnel between edge gateway 110 and inter-network hub 114 and between edge gateway 122 and inter-network hub 114. The message sent at 500 may include the following information for this example:
SRC_domain=Network1
SRC_IP=10.195.14.17
FWD_IP_S4=10.195.14.19
DST_domain=Network2
Local_S4_IP=10.125.14.41
In this example, the message specifies the following: (1) the network of the source of traffic is "Network1"; (2) the IP address of the source of traffic is "10.195.14.17"; (3) the assigned IP address of service 124 is "10.195.14.19"; (4) the network of the traffic destination is "Network2"; and (5) the IP address of the traffic destination within "Network2" is "10.125.14.41." Inter-network hub 114 may use this information to configure edge gateway 110, edge gateway 122, and switching performed by inter-network hub 114. For example, inter-network hub 114 may use this information to edit routing tables so that inter-network hub 114 routes packets from "10.195.14.17" and addressed to "10.195.14.19" to be delivered to "10.125.14.41." Additionally, in response to the message received at 500, inter-network hub 114 may send messages at 502 and 504 to establish an overlay network and configure a server poll in both networking domains. More specifically, inter-network hub 114 sends, at 502, a configuration message to edge gateway 122 that configures it with a tunnel endpoint to establish a tunnel. The configuration message may also configure edge gateway 122 to route traffic received from inter-network hub 114 to be routed to service 124 via the tunnel. For example, the configuration message may configure edge gateway 122 to pull traffic from inter-network hub 114 that is from "10.195.14.17" and addressed to "10.195.14.19." The configuration message may also configure edge gateway 122 to route such traffic, once pulled, to service 124. Thus, even though such traffic is addressed to "10.195.14.19," edge gateway 122 is configured by the configuration message at 502 to deliver it to "10.125.14.41" (e.g., service 124). Further, inter-network hub 114 sends, at 504, a configuration message to edge gateway 110 that configures it with a tunnel endpoint to establish a tunnel. The configuration message may also configure edge gateway 110 to route traffic received from client 112 to be routed to inter-network hub 114 via the tunnel. For example, the configuration message may configure edge gateway 110 to route traffic from "10.195.14.17" and addressed to "10.195.14.19" to inter-network hub 114. Once these two tunnels are established, client 112 may use the tunnels to send application traffic to service 124. Likewise, service 124 may use the tunnels to send application traffic to client 112 (not shown).

At 506, client 112 sends application traffic addressed to "10.195.14.19" to edge gateway 110. Once received, edge gateway 110 routes this traffic to inter-network hub 114 via the tunnel between edge gateway 110 and inter-network hub 114. Next, inter-network hub 114 forwards this traffic to edge gateway 122 via the tunnel between inter-network hub 114 and edge gateway 122. As noted above, in some embodiments, inter-network hub 114 forwards traffic based on a pull mechanism. As such, edge gateway 122 may send a message to inter-network hub 114 asking whether inter-network hub 114 has any application traffic for it. In response to this message, inter-network hub 114 may deliver the application traffic to edge gateway 122. In some embodiments, inter-network hub 114 checks the source IP address of the application traffic to ensure the application traffic is being sent by client 112. Finally, edge gateway 122 routes the traffic to service 124.

Figure 6:
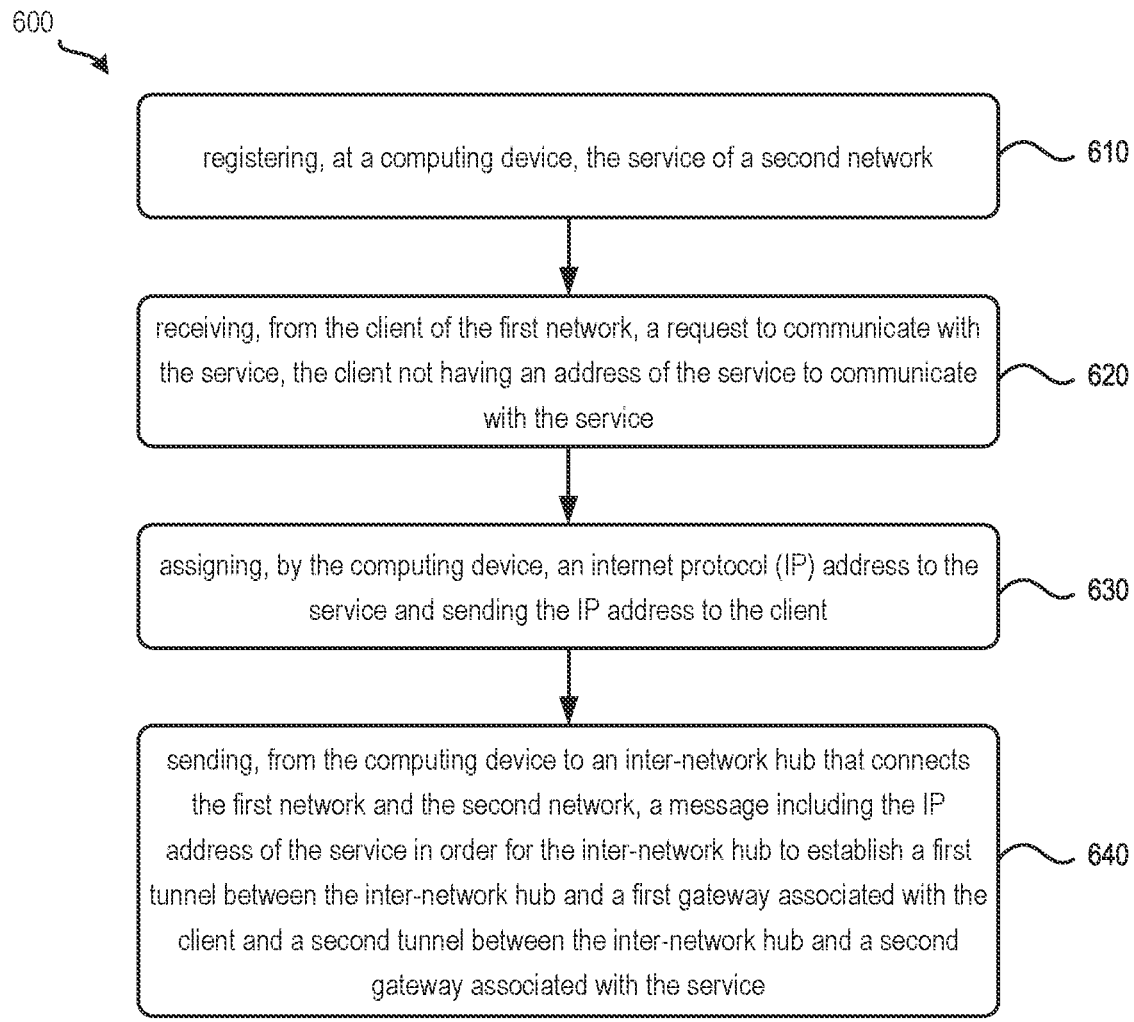
FIG. 6 illustrates a process for connecting a client of a first network and a service of a second network according to some embodiments

FIG. 6 illustrates a process 600 for connecting a client of a first network and a service of a second network, according to some embodiments. In some embodiments, computing device 102 performs process 600. For example, orchestrator 104, along with DNS 106 and IPAM 108, may perform process 600. Process 600 begins by registering, at 610, the service of the second network. Referring to FIG. 3 as an example, orchestrator 104 registers service 124 at DNS 106.

Next, process 600 receives, at 620, from the client of the first network, a request to communicate with the service, the client not having an address of the service to communicate with the service. Referring to FIG. 4 as an example, client 112 requests to communicate with service 124 by sending a DNS request to DNS 106 at 400. At this time, client 112 has a name but not an address of service 124.

Process 600 then assigns, at 630, an IP address to the service and sends the IP address to the client. Referring again to FIG. 4 as an example, orchestrator 104 assigns an IP address to service 124 by requesting IPAM 108 select an available IP address from a pool of available IP addresses local to network 100. Once IPAM 108 selects and responds with the IP address, orchestrator 104 then sends a message to DNS 106 to update the DNS record for service 124 with the assigned IP address.

After operation 630, process 600 sends, at 640, a message to an inter-network hub that connects the first and second networks, the message including the IP address of the service in order for the inter-network hub to establish a first tunnel between the inter-network hub and a first gateway associated with the client and a second tunnel between the inter-network hub and a second gateway associated with the service. Referring to FIG. 5 as an example, orchestrator 104 sends, at 500, a message to inter-network hub 114 in order for inter-network hub 114 to establish a first tunnel between inter-network hub 114 and edge gateway 110 and a second tunnel between inter-network hub 114 and edge gateway 122. In turn, inter-network hub 114 sends, at 502 and 504, configuration messages to edge gateway 122 and edge gateway 110 to establish the second tunnel and the first tunnel, respectively.

Figure 7:
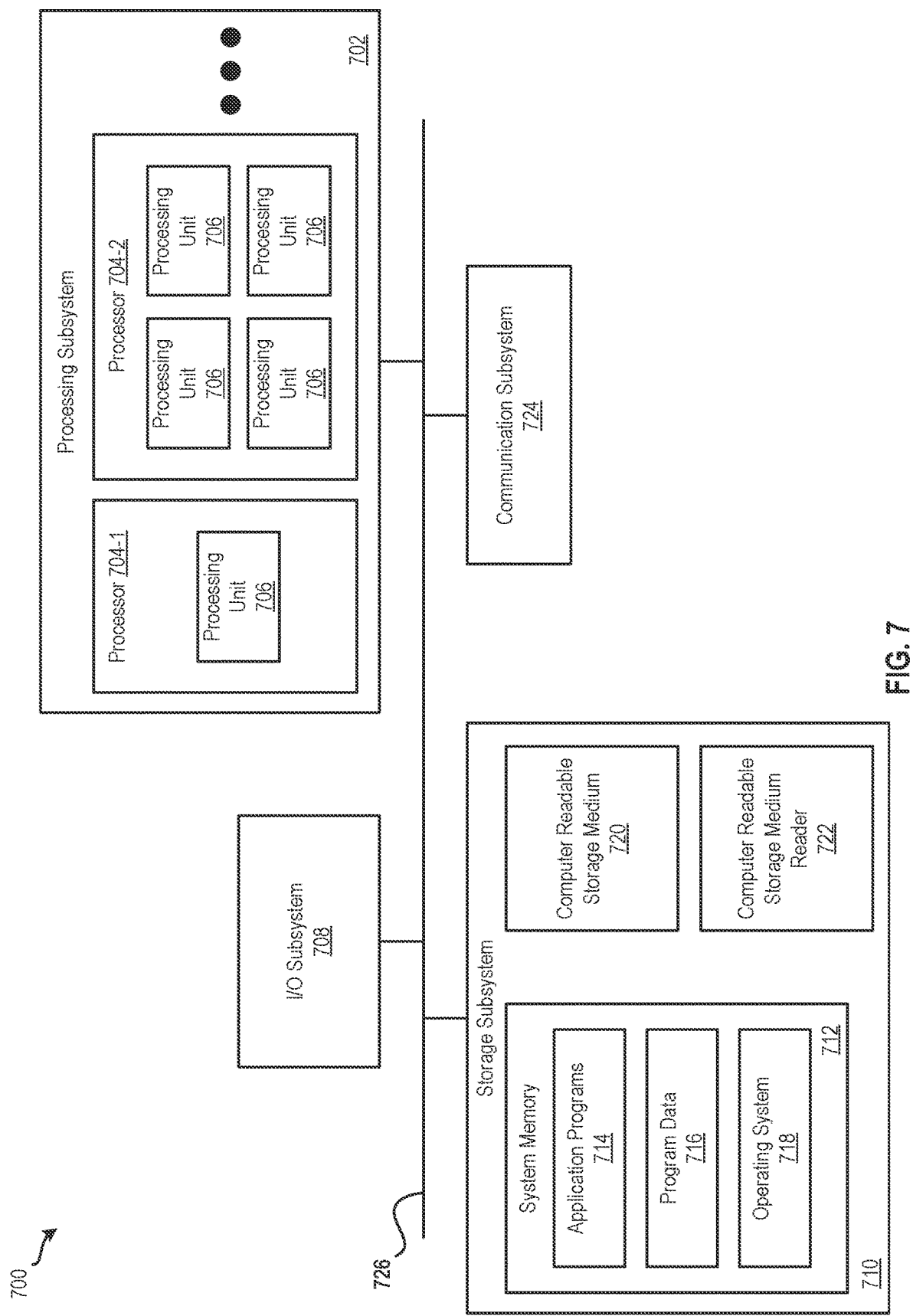
FIG. 7 illustrates an exemplary a computer system for implementing various embodiments described above.

FIG. 7 illustrates an exemplary computer system 700 for implementing various embodiments described above. For example, computer system 700 may be used to implement computing device 102, client 112, or service 124. Computer system 700 may be a desktop computer, a laptop, a server computer, or any other type of computer system or combination thereof. Some or all elements of orchestrator 104, DNS 106, IPAM 108, client 112, or service 124 or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., orchestrator 104, DNS 106, IPAM 108, etc.), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., orchestrator 104, DNS 106, IPAM 108, client 112, service 124, etc.) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
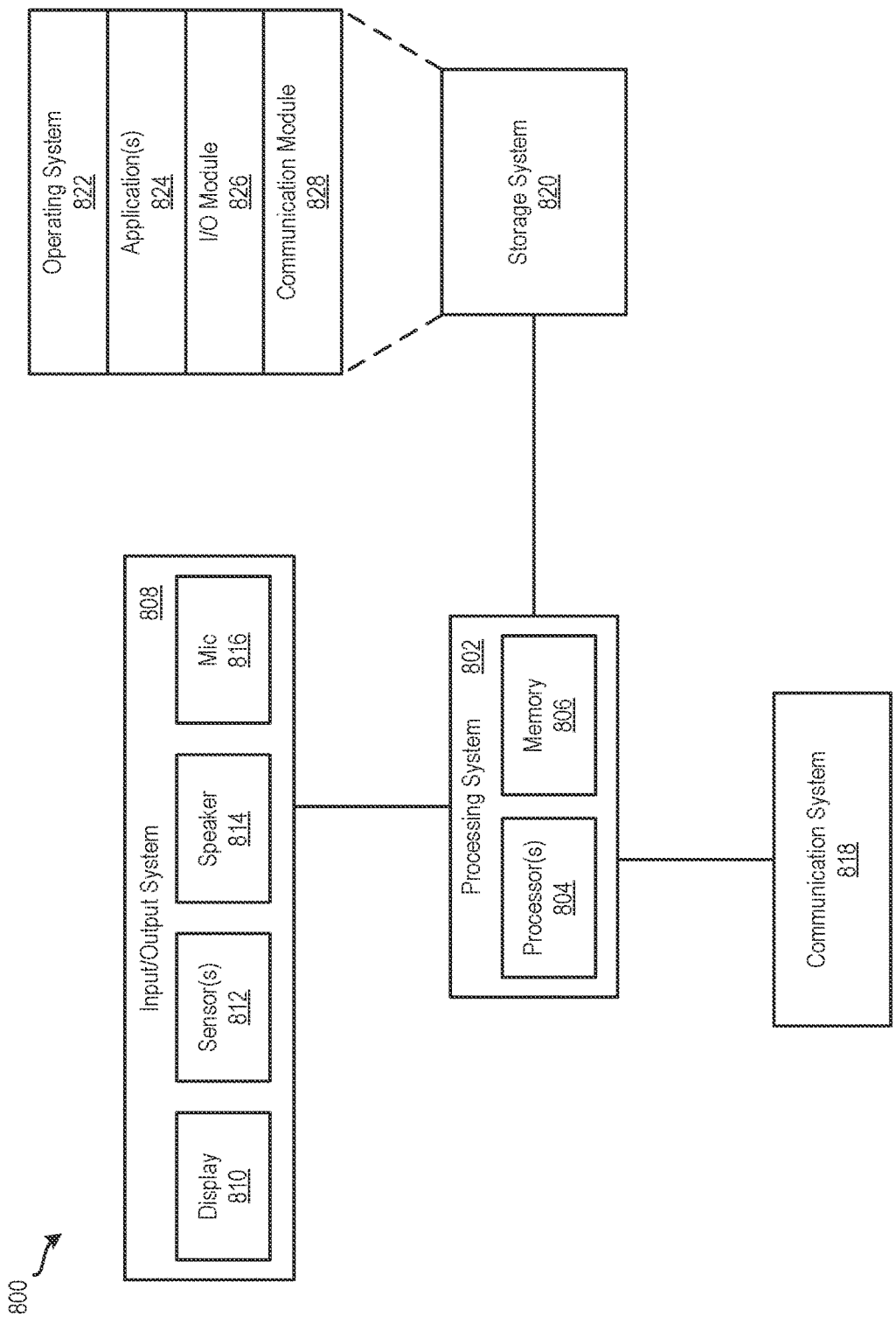
FIG. 8 illustrates an exemplary computing device for implementing various embodiments described above.

FIG. 8 illustrates an exemplary computing device 800 for implementing various embodiments described above. For example, computing device 800 may be used to implement computing device 102. Computing device 800 may be a cellphone, a smartphone, a wearable device, an activity tracker or manager, a tablet, a personal digital assistant (PDA), a media player, or any other type of mobile computing device or combination thereof. Some or all elements of orchestrator 104, DNS 106, IPAM 108, client 112, service 124 or combinations thereof can be included or implemented in computing device 800. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., orchestrator 104) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. For example, orchestrator 104 may be installed on computing device 800. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

FIG. 9 illustrates an exemplary system 900 for implementing various embodiments described above. For example, service 916 of cloud computing system 912 may be used to implement service 124 and client devices 902-908 may be used to implement client 112. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A method of connecting a client of a first network to a service of a second network, the method comprising:
　　registering, at a computing device, the service of the second network;
　　receiving, from the client of the first network, a request to communicate with the service, the client not having an address of the service to communicate with the service;
　　assigning, by the computing device, an internet protocol (IP) address to the service and sending the IP address to the client; and
　　sending, from the computing device to an inter-network hub that connects the first network and the second network, a message including the IP address of the service, an IP address of a first gateway associated with the client, and an IP address of a second gateway associated with the service in order for the inter-network hub to establish a first tunnel between the inter-network hub and the first gateway and a second tunnel between the inter-network hub and the second gateway.

2. The method of claim 1, wherein the message is a first message, wherein the inter-network hub sends the first gateway a second message that configures the first gateway to route traffic received from the client and addressed to the IP address of the service to the inter-network hub for communication to the service.

3. The method of claim 1, wherein the message is a first message, wherein registering the service of the second network comprises:
receiving, at the computing device from the service, a second message including a service name, a destination IP address, and an identifier for the second gateway; and
sending an update to a domain name system (DNS) with the service name and the destination IP address.

4. The method of claim 3, wherein the request to communicate with the service includes the service name and wherein assigning the IP address comprises:
determining that the service name in the request to communicate with the service is registered at the DNS;
selecting, by the computing device, the IP address from a pool of IP addresses local to the first network; and
sending an update to DNS with the IP address to replace the destination IP address for the service name;
wherein the DNS sends the IP address to the client in response to the request to communicate with the service.

5. The method of claim 1, wherein the first network is a on-premises network and wherein the second network is a virtual private cloud (VPC).

6. The method of claim 1, wherein the first network includes the computing device.

7. The method of claim 1, wherein the first network includes the first gateway and wherein the second network includes the second gateway.

8. A non-transitory machine-readable medium storing a program executable by at least one processing unit of a device for connecting a client of a first network to a service of a second network, the program comprising sets of instructions for:
registering, at a computing device, the service of the second network;
receiving, from the client of the first network, a request to communicate with the service, the client not having an address of the service to communicate with the service;
assigning, by the computing device, an internet protocol (IP) address to the service and sending the IP address to the client; and
sending, from the computing device to an inter-network hub that connects the first network and the second network, a message including the IP address of the service, an IP address of a first gateway associated with the client, and an IP address of a second gateway associated with the service in order for the inter-network hub to establish a first tunnel between the inter-network hub and the first gateway and a second tunnel between the inter-network hub and the second gateway.

9. The non-transitory machine-readable medium of claim 8, wherein the message is a first message, wherein the inter-network hub sends the first gateway a second message that configures the first gateway to route traffic received from the client and addressed to the IP address of the service to the inter-network hub for communication to the service.

10. The non-transitory machine-readable medium of claim 8, wherein the message is a first message, wherein instructions for registering the service of the second network comprises instructions for:
receiving, at the computing device from the service, a second message including a service name, a destination IP address, and an identifier for the second gateway; and
sending an update to a domain name system (DNS) with the service name and the destination IP address.

11. The non-transitory machine-readable medium of claim 10, wherein the request to communicate with the service includes the service name and wherein instructions for assigning the IP address comprises instructions for:
determining that the service name in the request to communicate with the service is registered at the DNS;
selecting, by the computing device, the IP address from a pool of IP addresses local to the first network; and
sending an update to DNS with the IP address to replace the destination IP address for the service name;
wherein the DNS sends the IP address to the client in response to the request to communicate with the service.

12. The non-transitory machine-readable medium of claim 8, wherein the first network is a on-premises network and wherein the second network is a virtual private cloud (VPC).

13. The non-transitory machine-readable medium of claim 8, wherein the first network includes the computing device.

14. The non-transitory machine-readable medium of claim 8, wherein the first network includes the first gateway and wherein the second network includes the second gateway.

15. A system comprising:
a set of processing units; and
a non-transitory machine-readable medium storing a program for connecting a client of a first network to a service of a second network and executable by the set of processing units, the program comprising sets of instructions for:
registering the service of the second network;
receiving, from the client of the first network, a request to communicate with the service, the client not having an address of the service to communicate with the service;
assigning an internet protocol (IP) address to the service and sending the IP address to the client; and
sending, to an inter-network hub that connects the first network and the second network, a message including the IP address of the service, an IP address of a first gateway associated with the client, and an IP address of a second gateway associated with the service in order for the inter-network hub to establish a first tunnel between the inter-network hub and the first gateway and a second tunnel between the inter-network hub and the second gateway.

16. The system of claim 15, wherein the message is a first message, wherein the inter-network hub sends the first gateway a second message that configures the first gateway to route traffic received from the client and addressed to the IP address of the service to the inter-network hub for communication to the service.

17. The system of claim 15, wherein the message is a first message, wherein instructions for registering the service of the second network comprises instructions for:
  receiving, from the service, a second message including a service name, a destination IP address, and an identifier for the second gateway; and
  sending an update to a domain name system (DNS) with the service name and the destination IP address.

18. The system of claim 17, wherein the request to communicate with the service includes the service name and wherein instructions for assigning the IP address comprises instructions for:
  determining that the service name in the request to communicate with the service is registered at the DNS;
  selecting the IP address from a pool of IP addresses local to the first network; and
  sending an update to the DNS with the IP address to replace the destination IP address for the service name;
  wherein the DNS sends the IP address to the client in response to the request to communicate with the service.

19. The system of claim 15, wherein the first network is a on-premises network and wherein the second network is a virtual private cloud (VPC).

20. The system of claim 15, wherein the first network includes the system and the first gateway and the second network includes the second gateway.

* * * * *